June 1, 1926.  1,587,285
R. CONRADER
TRANSFORMER COOLER
Filed Oct. 12, 1925  2 Sheets-Sheet 1
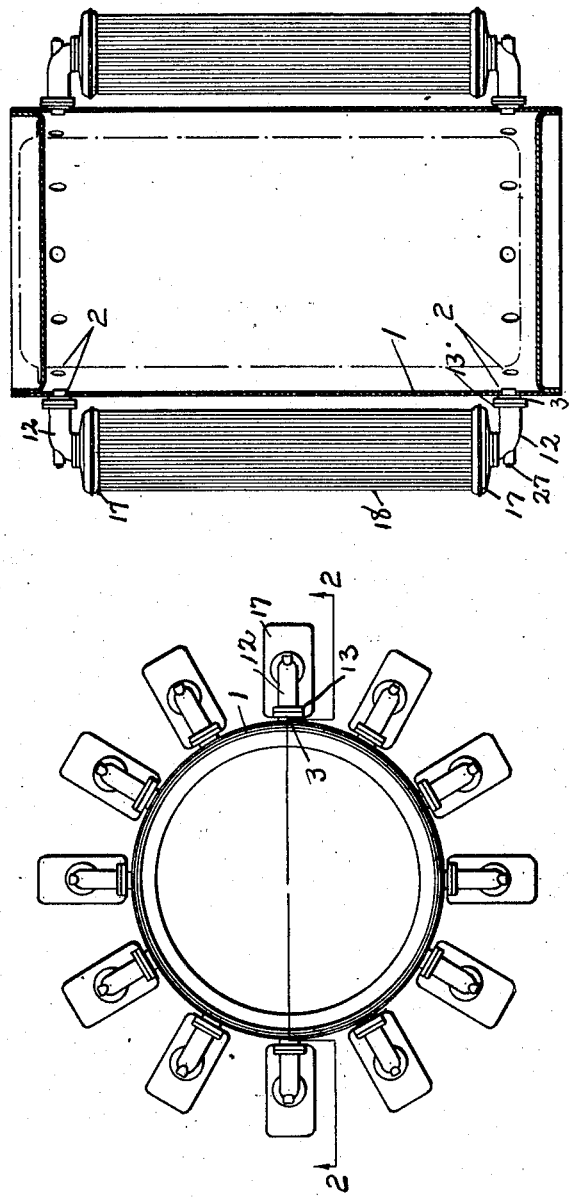
Inventor
Rudolph Conrader
By
Attorney June 1, 1926.
R. CONRADER
1,587,285
TRANSFORMER COOLER
Filed Oct. 12, 1925    2 Sheets-Sheet 2
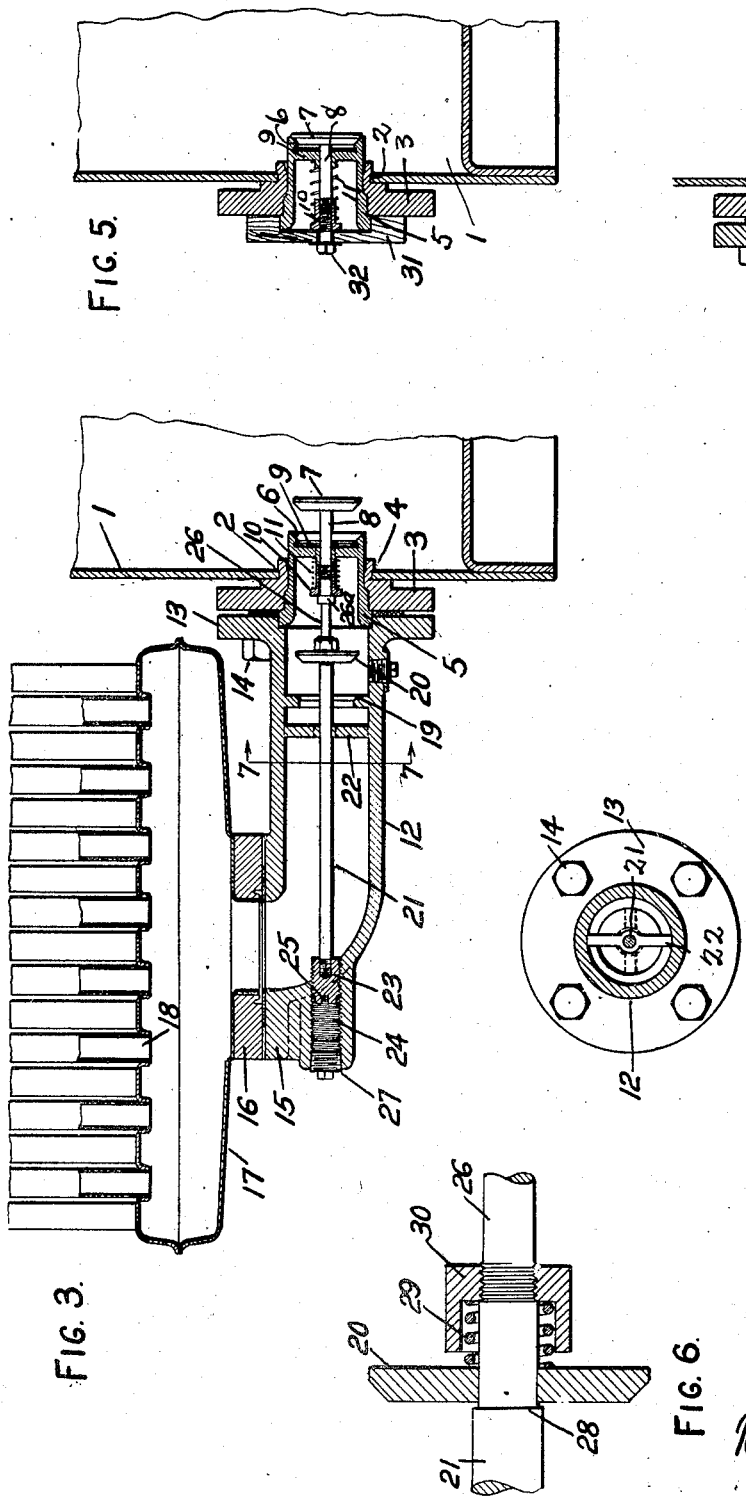
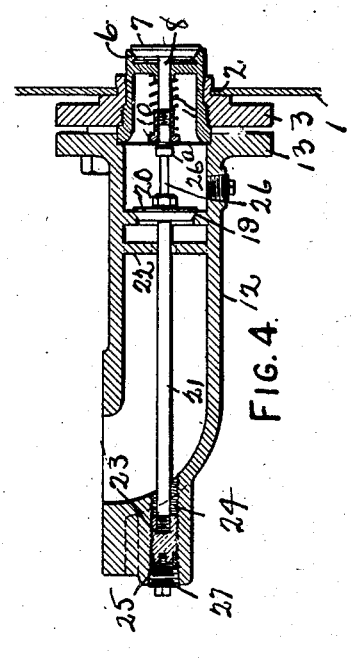

Patented June 1, 1926.

1,587,285

UNITED STATES PATENT OFFICE.

RUDOLPH CONRADER, OF ERIE, PENNSYLVANIA.

TRANSFORMER COOLER.

Application filed October 12, 1925. Serial No. 61,972.

This invention is directed to the improvement of transformer coolers simplifying the manner of detaching and attaching transformer radiators to the transformer tank for shipment, or handling. In an application filed by me, April 17th, 1925, Serial Number 23,751 I have shown certain improvements as to such a structure and the present invention is, in some respects, a further development of this improvement. The structure shown in the former application was so arranged that the openings between the radiators and the tanks could be closed so as to permit the removal of the radiator and the radiator could be re-attached and the connection to the tank opened with the radiator in place. With the present invention it is designed not only to open and close the connection to the tank so that the radiator may be removed without leakage from the tank but also to close the connection on the parts removed with the radiator so that the radiator may remain filled after its removal. Features and details of the invention will appear from the specification and claims.

The invention is illustrated in the accompanying drawings as follows:—

Fig. 1 shows a plan view of the device.

Fig. 2 a section on the line 2—2 in Fig. 1.

Fig. 3 an enlarged section of one of the radiator connections open.

Fig. 4 a view of the fittings with the connections closed.

Fig. 5 an enlarged section showing the tank with the radiator removed.

Fig. 6 an enlarged section of the closure valve for the radiator.

Fig. 7 a section on the line 7—7 in Fig. 3.

1 marks the transformer tank. This is provided with a series of radial openings 2. Fittings 3 have projections 4 which are expanded in the openings 2. Valve fittings 5 are screwed into the fittings 3 and valve seats 6 are formed on the inner ends of the fittings 5. Valves 7 seat on the seats 6. These valves are provided with stems 8 which extend through spiders 9 in the fittings 5. An internally screw-threaded head 10 is arranged on the inner end of the stem and a spring 11 is tensioned between the spider and the head and tends to close the valve 7.

A radiator elbow 12 has a flanged end 13 which is secured by screws 14 to the fittings 3. The opposite end of this L has a flange 15 which is secured to a flange 16 on the radiator header 17, the radiator tubes 18 leading to this header. It will be understood that the same construction is arranged at the top and bottom of the radiator.

A valve seat 19 is arranged in the elbow 12 and a valve 20 operates on this seat. The valve is mounted on a stem 21. The stem 21 extends through a spider 22 and is secured on a screw-threaded plug 23 which operates in a screw-threaded opening 24 in the end of the L and concentric with the valves 20 and 17. The plug has a slot 25 by means of which it may be turned in the opening 24 so as to move the stem 21 inwardly and outwardly to open and close the valve 20.

The stem 21 has an extension 26 which contacts the head 10, being provided with a shoulder 26ᵃ for engaging the end of the head. When, therefore, the valve 20 is moved off its seat the extension 26 forces the valve 7 off its seat. When the valve 20 is closed the valve 7 is closed through the action of the spring 11, the valve 20 being spaced so as to permit the full closing of the valve 7 before the seating of the valve 20.

With both valves seated the radiator may be removed by removing the screws 14 and the liquid will be retained in both the tank and the radiator. When the radiator is permanently in place and the plug 23 at its inner position in order to assure a tight seal of the screw-threaded opening 24 an ordinary plug 27 is screwed into the end of the opening.

The radiators are ordinarily completely filled with liquid and if there is a very decided change in temperature there will be some expansion of this liquid. In order to take care of this the valve 20 is yieldingly mounted on the stem 21. This is accomplished by the structure as clearly shown in Fig. 6. The stem has a shoulder 28 against which the valve 20 is yieldingly held by a spring 29, the spring being anchored against a flanged end 30 on the extension 26. It will readily be seen that if the pressure in the radiator becomes greater than the force of the spring 29 the valve will open permitting a sufficient amount of liquid to escape to relieve the pressure on the radiator.

When the radiator is separated from the tank a cover board 31 is placed on the fitting 3 and a cap screw 32 extends through this board into the head 10, thus securing the board in place and securing the valve on its seat.

What I claim as new is:—

1. In a transformer cooler, the combination of a tank having openings therein; a radiator detachably secured to the tank and having openings registering with the openings in the tank through which connection between the tank and radiator is made; a valve controlling the opening to the tank; a valve controlling the opening to the radiator; and means operable to actuate the valves with the radiator attached.

2. In a transformer cooler, the combination of a tank having an opening therein; a radiator; a detachable connection between the radiator and the tank at the opening having an opening from the radiator; a valve controlling the opening to the tank; a valve controlling the opening to the radiator arranged in said connection; and a common means for operating said valves.

3. In a transformer cooler, the combination of a tank having an opening therein; a radiator detachably secured to the tank and having an opening registering with the opening to the tank forming a connection therewith; and means closing said openings with the radiator detached and operable with the radiator in place.

4. In a transformer cooler, the combination of a tank having an opening therein; a radiator; an elbow on the radiator detachably connected to the tank; a valve operating to close the opening leading from the tank to the elbow; a valve closing the opening through the elbow; and means operable through the elbow for actuating said valves.

5. In a transformer cooler, the combination of a tank having an opening therein; a radiator; an elbow on the radiator detachably connected to the tank; a valve operable to close the opening to the tank; a valve in the elbow concentric with the valve on the tank; and a common means operable through the elbow for actuating said valves.

6. In a transformer cooler, the combination of a tank having an opening therein; a radiator; a connection between the radiator and the tank; a valve controlling the opening in the tank; a valve in the connection adapted to close the radiator; and a common means for actuating said valves, said means being separable permitting the removal or attachment of the radiator.

7. In a transformer cooler, the combination of a tank having an opening therein with a valve seat thereon; a radiator; an elbow on the radiator detachably connected to the tank and having a valve seat therein concentric with the valve seat in the tank; a radiator valve on the valve in the connection; a tank valve on the seat at the tank opening; a stem operating the radiator valve operable with the radiator in place; and an extension between said stem operating the valve on the tank opening.

8. In a transformer cooler, the combination of a tank having an opening therein; a radiator detachably secured to the tank and connected with the tank through the opening; and a valve controlling the connection to the radiator operable with the radiator in place, said valve being yielding when closed to permit the escape of liquid under pressure from the radiator.

9. In a transformer cooler, the combination of a tank having an opening therein; a radiator; a connection between the radiator and the tank; a valve in the tank; a valve in the connection; a stem operating said valves; and a yielding connection between the stem and the valve in the radiator.

In testimony whereof I have hereunto set my hand.

RUDOLPH CONRADER.